United States Patent [19]

Haake et al.

[11] Patent Number: 4,548,076
[45] Date of Patent: Oct. 22, 1985

[54] AIR FLOW VOLUME MEASURING APPARATUS

[75] Inventors: Paul F. Haake, Highland Park; Price R. Hodson, Elmhurst, both of Ill.

[73] Assignee: Alnor Instrument Company, Skokie, Ill.

[21] Appl. No.: 517,907

[22] Filed: Jul. 28, 1983

[51] Int. Cl.⁴ .............................................. G01F 5/00
[52] U.S. Cl. .................................. 73/202; 73/861.66; 73/861.76
[58] Field of Search ................ 73/861.65, 861.66, 202, 73/254, 861.76, 189; 137/98, 101

[56] References Cited

U.S. PATENT DOCUMENTS

| | | | |
|---|---|---|---|
| 1,753,552 | 4/1930 | Cornell | 73/254 |
| 2,060,848 | 11/1936 | Boyle | 73/861.76 X |
| 2,207,747 | 7/1940 | Manarik et al. | 73/861.76 X |
| 3,242,730 | 3/1966 | Peltola | 73/861.76 |
| 3,355,946 | 12/1967 | Lazell | 73/861.65 |
| 3,463,003 | 8/1969 | Pierman et al. | 73/189 |
| 4,030,358 | 6/1977 | Noll | 73/861.66 |
| 4,343,195 | 8/1982 | Victor et al. | 73/861.66 |
| 4,481,829 | 11/1984 | Shortridge | 73/861.66 |

*Primary Examiner*—Richard L. Chiesa
*Attorney, Agent, or Firm*—Silverman, Cass & Singer, Ltd.

[57] ABSTRACT

An improved selector provides for air paths between a meter and an air volume sensing manifold that are similar for both up and down flow of air through the apparatus thereof. This provides similar momentum losses in the air reaching the meter for both air up and down flow through the apparatus to obtain more accurate meter readings of the air flow volume. Separate throttling screws are provided for the throttling orifices, providing different range selections, and are independently adjusted to compensate for minor air passage differences in the selector, and air flow pattern differences in up and down flow. A calibrated area reducer in the form of a sheet of perforated stock is positioned upstream in the throat in contact with the manifold to extend the measuring range of the apparatus while minimally disturbing the air flow patterns through the apparatus.

16 Claims, 11 Drawing Figures

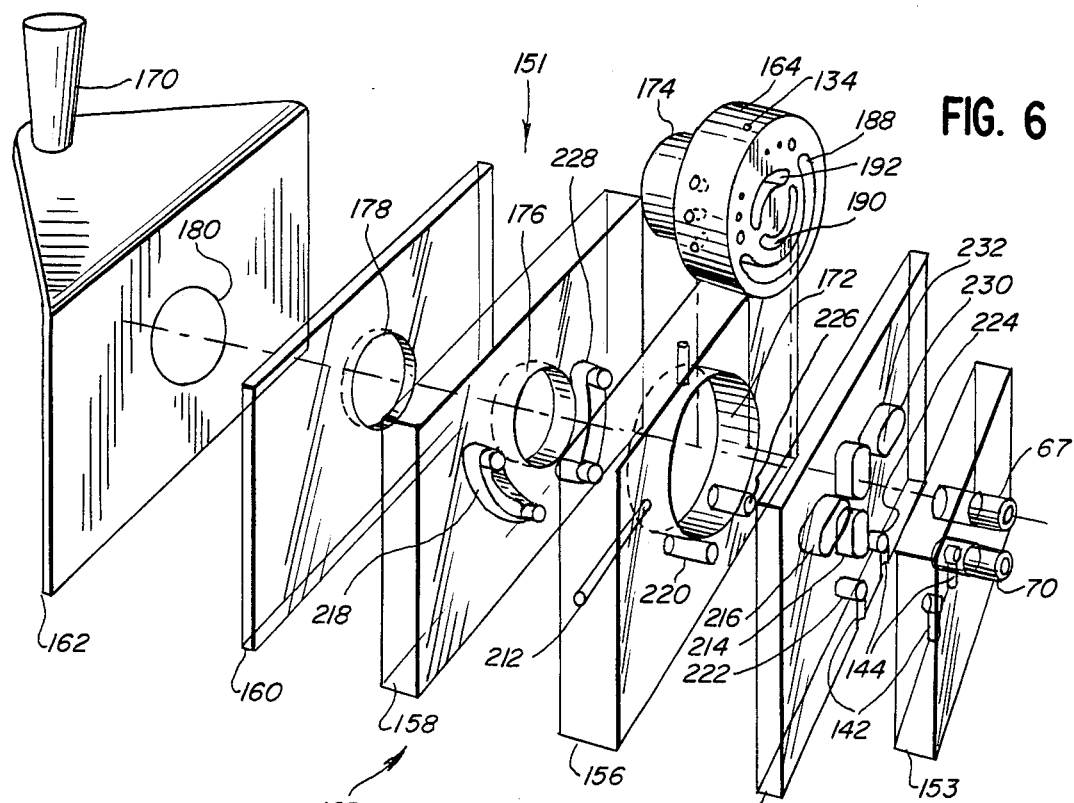
FIG. 6
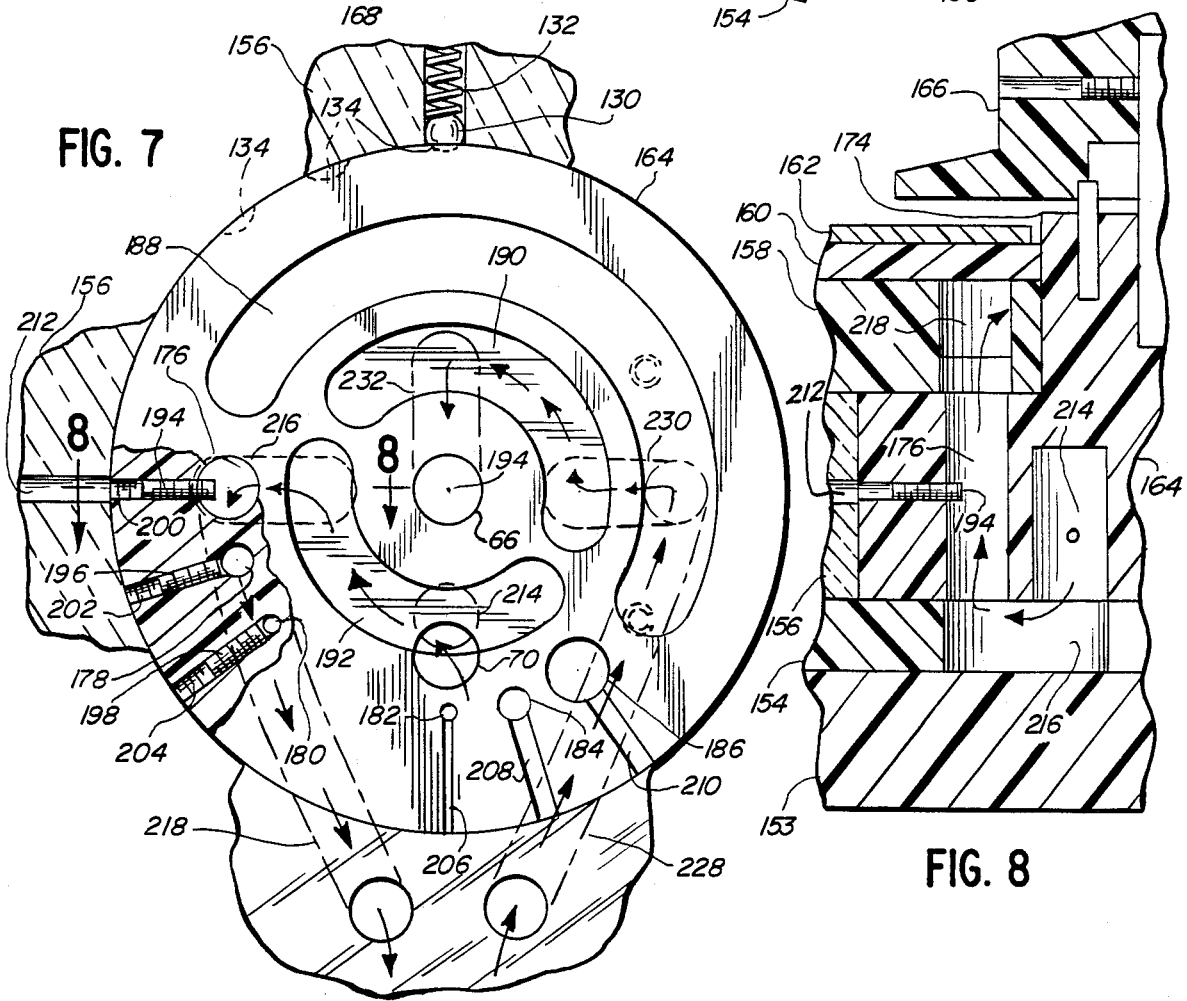
FIG. 7
FIG. 8

AIR FLOW VOLUME MEASURING APPARATUS

BACKGROUND OF THE INVENTION

This invention relates generally to air flow volume measuring apparatus in which the air flow is passed through a throat of known cross-sectional area and the volumetric measurement is determined as a direct function of air velocity, and more particularly to air flow volume measuring apparatus that are handheld and measure air volume with flow in either of the two directions through the known cross-sectional area throat.

Air flow volume measurements are performed in commercial and office buildings to balance heating, cooling and ventilating of the buildings. Balancing the air flow is desired to avoid portions of a building being hotter or colder, or more or less ventilated than other portions, and a building having well balanced air flow volumes is a more efficient user of heating, cooling and ventilating energy. Energy cost savings can be significant when the air flow volumes are well balanced.

These measurements are performed by measuring the volume of air per unit of time that passes through the air inlets and outlets throughout the building. From the measured data the heating, cooling and ventilating systems are adjusted to obtain desired flow rates to the different building portions, such as reception areas, hallways, individual offices and common areas. Long ago the measurements were performed by using a handheld air velocity measuring apparatus to determine the air velocity at an array of locations across any one inlet or outlet. The readings then were averaged and multiplied by a constant related to the type and size of the individual inlet or outlet to obtain a final reading. This process was time consuming and inaccurate.

Presently, the volume measurements are performed with an apparatus that directs the volume of air passing through an inlet or outlet through a throat of known area. The velocity of the air passing through the throat is used directly to indicate volume with a properly calibrated air velocity meter. The apparatus comprises a housing of sheet metal providing the throat of known area, and providing for mounting of additional elements thereon. A planar probe or manifold that is mounted in the throat transmits a representative sample of air entering the throat to a range selector and a velocity meter, and returns the air exhausted from the meter and selector to the volume of air exiting the throat. The velocity meter is a unidirectional device, air always passing through it in only one direction, and provides an indicator needle that is deflected at an angle proportional to the velocity of air passing through the meter. typically, this meter is the device disclosed and claimed in U.S. Pat. No. 3,463,003. The selector transmits the air to the velocity meter in the correct direction whether the air passes upward or downward through the throat and further extends the range of the velocity meter by throttling, in steps or ranges, the velocity of the air transmitted to the meter. A hood, made of woven material supported by rods, is attached to one end of the housing to aid in directing air flow through the throat. The hood further enables the meter to be at about eye level when the hood top is engaged around the periphery of a ceiling inlet or outlet.

In practice this prior apparatus is held by the operator with the hood top margin engaged around the inlet or outlet. The selector switch is rotated to the proper setting for the desired range and for air moving up or down through the apparatus, and the volume indicator needle is read. This prior apparatus is significantly more accurate in volumetric measurement than the prior method, but significant improvements therein are possible, mainly in the selector.

The selector of the prior apparatus comprises a laminated body of plastic plates having passages cut therein and a molded and cut disk rotatable in a central pocket of the body. The disk presents three radially extending throttling orifices of different cross-sectional diameter to throttle the air velocity passing therethrough and extend the range of the velocity meter. The disk is rotated to one side or the other of an OFF or null position depending on the direction of air flow through the throat and to align the desired throttling orifice with the body passages. The disk is held in a setting by a detenting ball and spring. Three calibration screws, one for each throttling orifice, are extendable axially of the disk into the throttling orifices to calibrate the apparatus.

In operation of the known selector, air flowing down through the throat forces air into the upper level of the manifold and into the selector, through the selected throttling orifice and across the throttling screw to the meter inlet tube. The return air from the meter outlet tube passes through a hollow in the selector disk and then exits from the lower level of the manifold to rejoin the air flowing down through the throat. Air flowing up through the throat first passes through the hollow in traveling to the meter and returns through the throttling orifice. This difference in flow paths results in a noticeable difference in measured air flow volumes depending on whether air is flowing down or up through the throat. The difference occurs because the air loses momentum and velocity as it winds through the manifold; the selector passages, orifice and hollow; and the velocity meter.

When the air passes through the throttling orifice on its way to the meter, there is a significantly different momentum and velocity loss than when the air passes through the throttling orifice returning from the meter, the orifice presenting the greatest constriction for the air flow through the manifold, selector and meter. Thus, calibrating the apparatus with air downflow results in noticeable error in measured volume with air upflow.

Additional error occurs due to a different air flow profile occurring through the throat depending upon the direction in which the air passes through the aperture. Air from the manifold indicates different velocities depending upon whether the throat air flow is up or down. Again, one throttling screw is inadequate to adjust for this error.

These two effects are additive and can cause a total error that swings 5%, i.e. calibrating the apparatus to zero error with throat upflow results in a 5% error in downflow air volume data. In a small building a 5% error in balancing heating, cooling and ventilating translates to a small total value in extra energy costs, but in a large building the extra energy costs can be enormous.

Additionally, the prior apparatus is limited in the resolution and repeatability from machine to machine of data obtained from the lower half, 250 cubic feet per minute (cfm) and less, of the meter's lowest volume range, 0–500 cfm. In practice, this is often the most useful portion of the meter ranges that the prior apparatus measures. It is used primarily in a large modern office building where there is a multitude of individual low volume air flow inlets and outlets rather than a single high volume air flow inlet and outlet.

Solving this problem requires more than simply providing an additional, twice as large cross-sectional area throttling orifice to provide the lower range. The lowest range throttling orifice already approaches the cross-sectional area of the passages through the selector, manifold and meter. Thus with a twice as large cross-sectional area throttling orifice, the passages through the manifold, selector and meter would act to throttle the air moving therethrough instead of the doubled area throttling orifice, which is undesirable.

The solution of the invention is not increasing the cross-sectional area of the throttling orifice but restricting the area of the throat with an additional element to cut in half the throat area and double the velocity of the air flowing through the throat. Caution must be exercised, however, to avoid disturbing the air flow pattern through the throat; a plate located in the throat with a central bore of half the area of the throat is unacceptable because it disturbs the normal air flow pattern through the throat and blocks some of the arrayed manifold entrances.

The invention provides a sheet of stock having an array of multiple, regularly spaced apart perforations, with the total of the free or open areas of the perforations being approximately equal to half of the area of the throat. Thus, the solidity or solid area of the sheet is also approximately half the area of the throat. Such a sheet or screen minimally affects the throat air flow pattern, doubles the throat air velocity, allows air access to the manifold entrances and is easily inserted and tension retained in the throat by the operator. The sheet easily is removable for changing to other volume ranges.

The use of inserts such as honeycombs, perforated plates and screens in direct flows is known to reduce or modify freestream turbulence in flowing gases. See Nagib, H.M.: Wray, J. L. and Tan-atichat, J., "Aeroacoustic Phenomena in Freestream Turbulence Manipulators," Progress in Astronautics and Aeronautics, Volume 37, 1975 and Loehrke, R.I.; Nagib, H.M., "Control of Free-Stream Turbulence by Means of Honeycombs: A Balance Between Suppression and Generation," Transactions of the ASME, Sept. 1976, Vol. 98, p.342 et seq., Journal of Fluids Engineering. The use of such inserts as area reducers and in particular as range extenders in air flow volume measuring apparatus is, however, unknown. None of this art suggests increasing the volume flow meter accuracy by increasing the accuracy of the sensing structure.

SUMMARY OF THE INVENTION

In accordance with the invention an improved air flow volume measuring apparatus is provided. The apparatus comprises a housing having a throat of known cross sectional area, a manifold positioned in the throat for receiving and returning samples of air flowing through the throat that are indicative of the air flow volume and a meter indicating the air flow volume in response to said air flow samples.

The apparatus further comprises a selector constructed and arranged to perform two functions: passing the air samples from the manifold to the meter in the correct sense for both air up and down flow through the throat and throttling the air samples to obtain a desired range indication on the meter.

The selector includes a body having air passages therein and a disk, which is mounted in the body, that has one throttling orifice for each range position and a slot separate from the orifices. The body and slot are constructed and arranged so that the air paths from the manifold to the meter and from the meter back to the manifold, respectively, are nearly identical for both air up and down flow through the throat. Thus, the body and disk are constructed and arranged so that regardless of the flow direction, air from the manifold passes through one of the orifices, free of the slot, to the meter, and air from the meter passes through the slot, free of the orifices, returning to the manifold.

Further, the apparatus comprises a calibrated area reducer in the form of a sheet of perforated stock that is inserted in contact with the manifold upstream of the air flow extending across the area of the throat. The reducer extends the range of the apparatus meter lower range by doubling the velocity of the air flowing across the manifold entrances while maintaining undisturbed the air flow patterns through the throat.

BRIEF DESCRIPTION OF THE DRAWING

FIG. 6 is an exploded perspective view of the selector of the invention;

FIG. 7 is a front elevational view of the selector disk of the invention, with surrounding partial sections of related structure and with underlays and overlays of related passages;

FIG. 8 is a partial sectional view of the selector and disk taken along the line 8—8 of FIG. 7 and in the direction indicated;

DESCRIPTION OF THE PREFERRED EMBODIMENT

The selectors in the known air flow volume measuring apparatus and in the invention function as adapters; they adapt the varying air flow volumes received in the fixed structure of the throat mounted manifold for use in the fixed structure of the air velocity meter. The selector provides the velocity meter, which otherwise is a single range device operating with air flowing through it in only one direction, with samples of air volume properly throttled and moving in the correct direction for the meter to indicate multiple ranges of air flow volumes for air flow up and down through the aperture.

Figure 1:
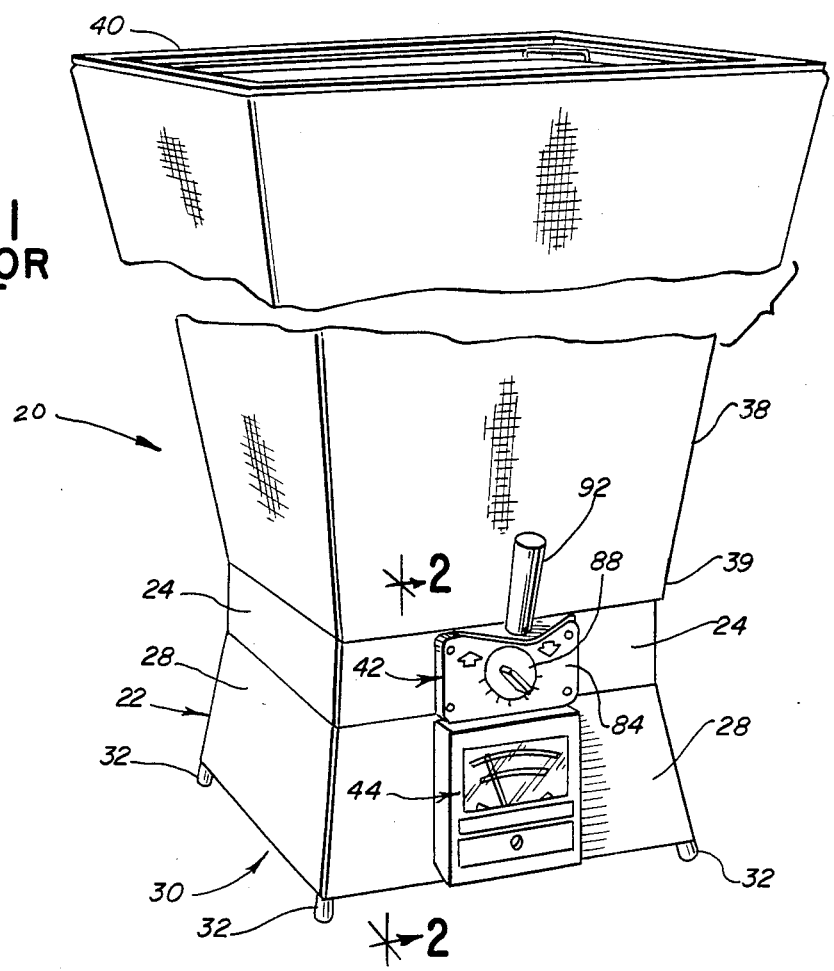
FIG. 1 is a perspective view of a known air flow volume measuring apparatus.
Figure 2:
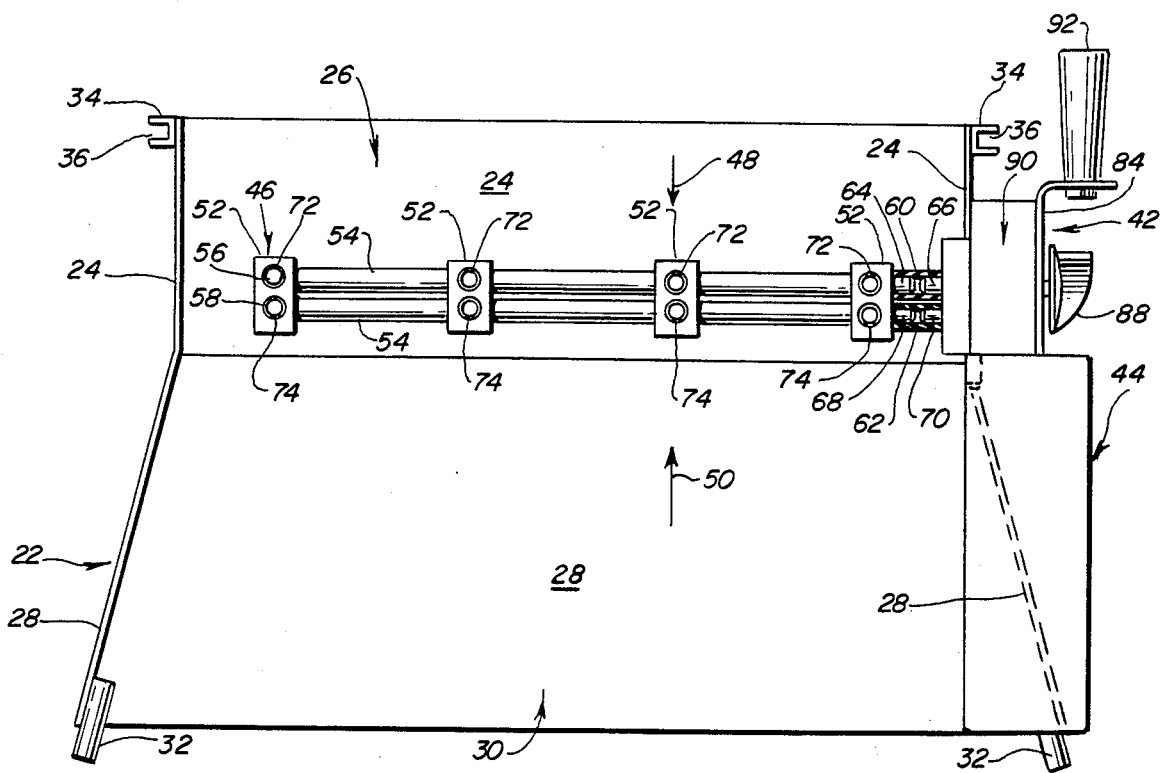
FIG. 2 is a side sectional view of the housing and related elements taken along the lines 2—2 of FIG. 1 and in the direction indicated.

In FIGS. 1 and 2 there is an air flow volume measuring apparatus of known design indicated generally by the reference character 20. Apparatus 20 comprises a housing 22 having four rigid, rectangularly arranged side walls 24 that form a throat 26 of known cross-sectional area. The four side walls 24 have depending portions 28 that form a lower skirt opening 30 of the housing having a cross-sectional area greater than throat 26. The housing is provided on its lower margin with four rubber feet 32 for resting the apparatus on a table top, and is further provided at its upper margin with a circumferential "U" channel 34 presenting an opening 36. A hood 38 is formed of a fabric or other light weight material that is removable from the housing 22 for folding and storage. Hood 38 has a lower elastic margin 39 that seats in the opening 36 of channel 34 to form substantially an airtight seal therewith. Hood 38 is held erect by an internal frame of rods that is not shown. The upper margin 40 of hood 38 is engageable with the periphery of an air inlet and outlet and is formed of a material that forms a substantially airtight seal with the inlet or outlet.

A selector 42 is mounted on one of side walls 24 and a volume indicating air flow velocity meter 44 is mounted on one of depending portions 28 immediately below selector 42. Selector 42 and meter 44 are connected to one another by resilient tubing that slips over pipe stubs extending from each of selector 42 and meter 44.

A manifold 46 is disposed in throat 26 substantially normal to the flow of air therethrough, which is indicated by the arrows 48 and 50, and is mounted to sidewalls 24 by resilient means that are not shown. Manifold 46 comprises a planar, and square arrangement of rectangular blocks 52 and cylindrical tubes 54 that form an interconnected upper passage 56 and interconnected lower passage 58. Upper and lower passages 56 and 58 are separate from one another and are individually connected to selector 42 by resilient tubes 60, 62 that respectively slip over upper and lower pipe stubs 64, 66 and 68, 70 extending respectively from the manifold and selector.

Upwardly opening entrances 72 are provided in the blocks 52 and tubes 54 forming the upper passage 56 and downwardly opening entrances 74 are provided in the blocks and tubes forming lower passage 58. These entrances provide communication of air to and from throat 26 and upper and lower levels 56, 58. There are sixteen each of entrances 72, 74 regularly spaced apart in a four by four array for sampling air velocity uniformly across the area of throat 26 and returning air thereto as earlier was explained.

Figure 3:
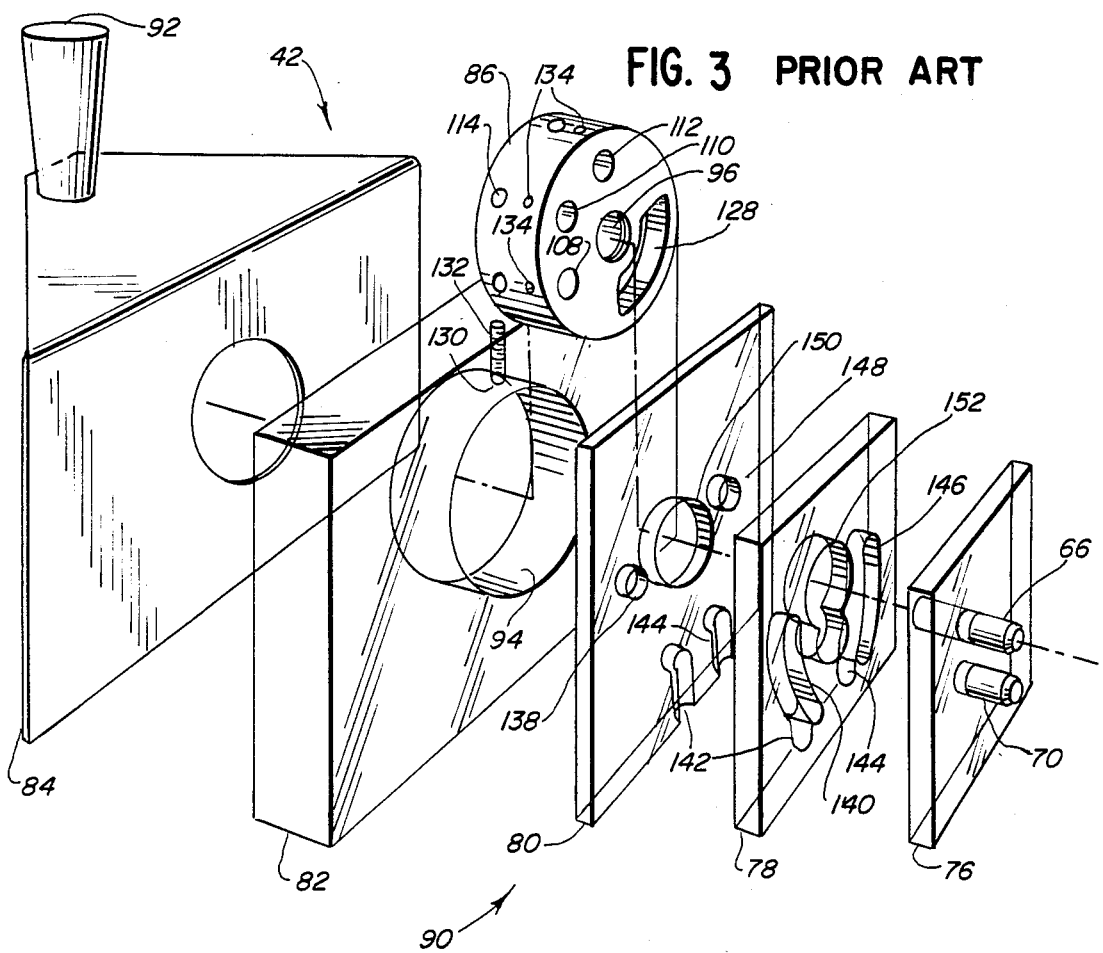
FIG. 3 is an exploded perspective view of the selector of the known apparatus.

In FIG. 3 the known selector 42 comprises five plates 76, 78, 80, 82 and 84 that are laminated to one another, a disk 86 and a knob 88 (see FIGS. 1 and 2). Plates 76, 78, 80 and 82 are generally rectangular elements formed of clear plastic material that form a body 90 while plate 84 is a sheet of metal that forms a face plate, see FIGS. 1 and 2. A handle 92 is mounted on an overhanging portion of plate 84 for manually holding the apparatus 20 against an inlet or outlet. Disk 86 is mounted in pocket 94 cut in plate 82. Plates 76, 78 and 80 have various air passages cut therein to be described presently.

Figure 4:
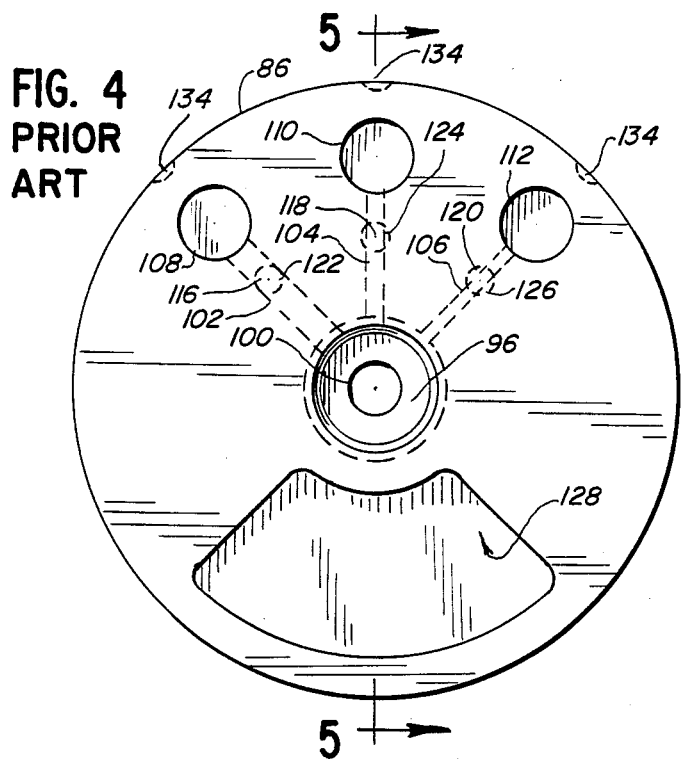
FIG. 4 is a front elevational view of the known selector disk of FIG. 3.
Figure 5:
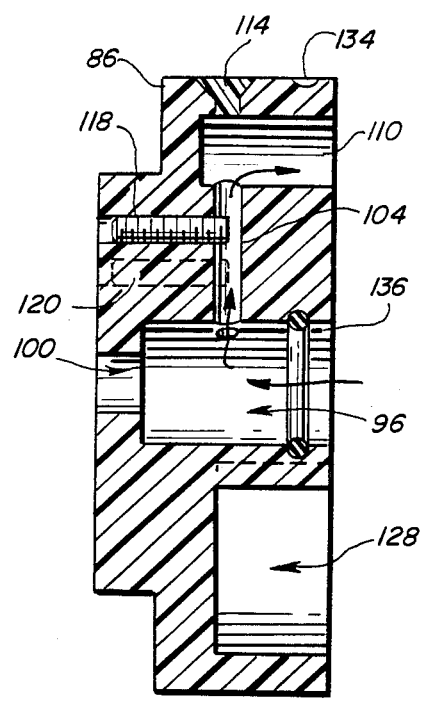
FIG. 5 is a median side sectional view of the known selector disk taken along the line 5—5 of FIG. 4 and in the direction indicated.

Referring to FIGS. 4 and 5, disk 86 is an integral plastic member having a central bore 96 formed axially therein with a small diameter bore portion 100 continuing therethrough. Typically a bolt, not shown, is inserted through portion 100 with itshead in bore 96 to attach the knob 88 to the disk 86. Disk 86 has three throttling orifices 102, 104 and 106 of different cross sectional areas radially cut therein from the bore 96 to axial passages 108, 110 and 112. Orifice 102 has the largest cross sectional area, orifice 104 has an intermediate area while orifice 106 has the smallest area. Orifices 102, 104 and 106 are drilled inwardly from the exterior of the disk and the circumferential portion 114 (see FIGS. 3 and 5) of the orifice beyond such as passage 110 is filled to seal against air leakage.

Throttling or adjustment screws 116, 118 and 120 are threaded into screw holes 122, 124 and 126 arranged axially of disk 86, and are rotated for protrusion into their respective orifices for calibrating the apparatus 20. Calibration occurs by controlled reduction of the cross sectional area of the orifice with the tip of the screw.

Disk 86 further is formed to present a hollow 128 open on only one side and extending across an arc of approximately a quarter of a circle. Disk 86 is held in position by a ball 130, spring 132 and detents 134 arrangement. The throttling orifices 102, 104 and 106 and axial passages 108, 110, 112 are regularly spaced apart and extend approximately across the arc opposite the hollow 128. Throttling orifice 102 corresponds to the range 500 CFM; orifice 104 corresponds to the range 1000 CFM and orifice 106 corresponds to the range 2000 CFM.

When selector 42 is assembled, top pipe stub 66, which extends through plates 76, 78 and 80 and half way into plate 82, fits into bore 96. An air tight seal between stub 66 and disk 86 is formed by an "O" ring 136 seated around the bore 96 in disk 86.

In operation with downflow through throat 26 and the selector set to the 500 CFM range (FIG. 3) air entering through top stub 66 from the manifold upper level passes into bore 96, through an orifice such as 102, through axial passage 108, through passage 138, through passage 140 to outlet 142 formed in plates 78 and 80 to the meter. Air exhausted from the meter passes into inlet 144, through passage 146, through passage 148, through hollow 128, through passages 150 and 152 to lower pipe stub 70 where it exits the selector to the manifold lower level.

With upflow and the same 500 CFM range setting, the disk is rotated approximately 180 degrees so that passage 108 is aligned with passage 148 in plate 80. The air from the manifold lower level enters through stub 70, through passages 152 and 150 to hollow 128, through passage 138, through passage 140 and exits the selector through outlet 142 to the meter. Air exhausted from the meter enters inlet 144, passes through passage 146, through passage 148, through disk axial passage 108, throttling orifice 102 into bore 96, and exits through stub 66 to the manifold upper level.

Thus, the air flow through the selector is different when there is upflow and downflow through the apparatus aperture. This results in differences in flow to be indicated in the meter due to differences in air momentum losses through the selector. The selector of the invention overcomes this problem.

The selector of the invention is illustrated in FIGS. 6, 7 and 8 and is indicated generally by the reference character 151. Selector 151 performs the same functions in apparatus 20 as selector 42, but does so in an improved, different manner resulting from a different structural arrangement of elements.

Figure 9:
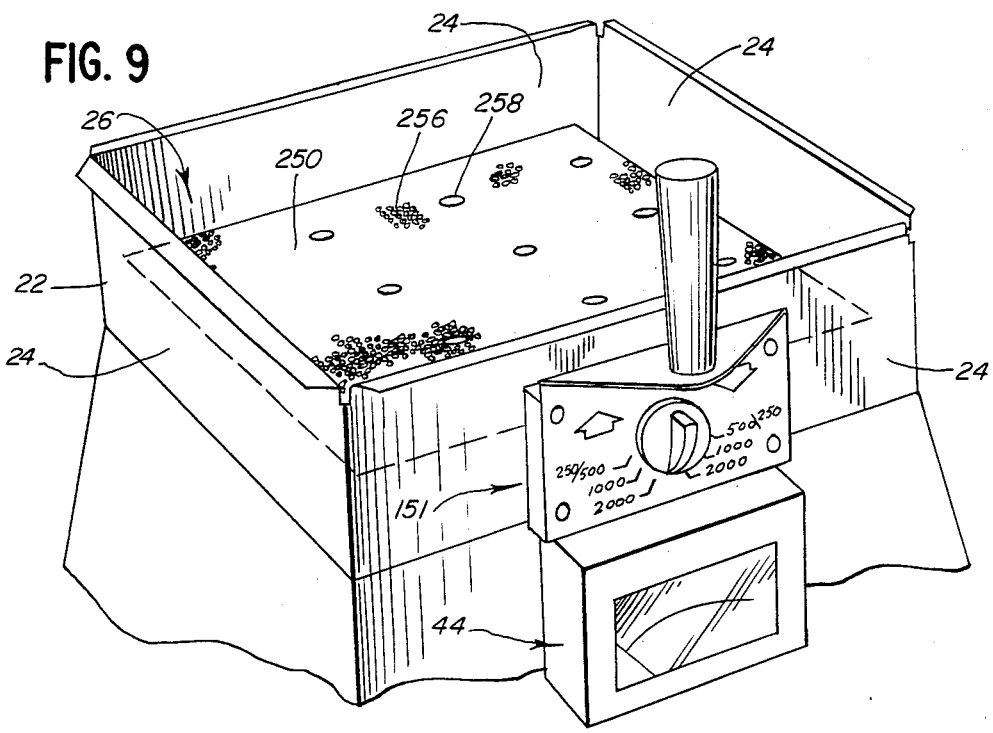
FIG. 9 is a perspective view of the apparatus housing illustrating the sheet of perforated stock of the invention.

Selector 151 comprises plates 153, 154, 156, 158, 160 and 162 that are laminated to one another, a disk 164 and a knob 166 (FIG. 8). Plates 153–160 are generally rectangular elements formed of clear plastic material that form a body 168, while plate 162 is a sheet of metal that forms a face plate, see FIG. 9. Alternatively, the plates 153-162 may be formed of any material desired. A handle 170 is mounted on an overhanging portion of plate 162 for holding the apparatus 20. Disk 164 is mounted in a pocket 172 of plate 156. Plates 153-156 and 158-160 are laminated to one another by such as gluing to seal against air leakage from between the plates. Plate 158 is sealed to plate 156 using a liquid gasketing material to provide for disassembly if required. Additionally, or alternatively, the plates may be fastened together by such as bolts passing through the corners of the plates. The disk and plates form several air passages.

Disk 164 is a cylindrical member having a reduced diameter portion 174 that fits through passages 176, 178 and 180 in plates 158, 160 and 162. Knob 166 is attached to the flat end of the portion 174 for rotating the disk through the seven settings for the six meter ranges and the OFF position. A ball 130, spring 132 and detents 134 arrangement holds the disk 164 in the desired setting, in a manner like that for disk 86.

Disk 164 is formed to present six throttling orifices 176, 178 180, 182, 184 and 186 arranged axially along a half circle arc offset from the center of the disk, one orifice for each provided range setting. The orifices are arranged in pairs of different diameters. Thus, orifices 176 and 186 are of one large diameter or cross sectional area and correspond to the range for 500 CFM, orifices 178 and 184 are of an intermediate diameter and correspond to the range for 1000 CFM, and orifices 180 and 182 are of a small diameter and correspond to the range for 2000 CFM. The orifices are regularly spaced from one another and are grouped in two groups of three on both sides of a central OFF position or solid portion of the disk, which is formed of an opaque plastic material such as nylon. The disk may be formed of any material desired.

Disk 164 is formed also to present one arcuate slot 188 passing through the greater diameter portion of the disk, and to present two arcuate hollows 190 and 192. Slot 188 extends across an arc of approximately one half circle and at approximately the same radial distance from the center 194 of the disk as the six throttling orifices. Hollows 190 and 192 extend across arcs slightly less than one half circle, with hollow 190 being in the same half circle as slot 188 and hollow 192 being in the same half circle as the orifices.

Associated with each throttling orifice is a separate throttling or adjusting screw (of which only three are.-shown) 194, 196 and threaded into screw holes 200, 202, 204, 206, 208 and 210. Access to the throttling screws is through passage 212 formed in plate 156 when the associated orifice is in the operative position.

In operation with the disk rotated to a position for the range of 500 CFM and upflow through the apparatus manifold (FIG. 7), air enters the selector through lower stub 70 from the manifold lower level passes through passage 214 to hollow 192, through hollow 192, through passage 216, through throttling orifice 176, through passage 218, through passage 220 and through passage 222 to outlet 142 and the meter.

Air exhausted from the meter enters the selector inlet 144, passes through passage 224, passage 226 and passage 228 to slot 188, through slot 188 to passage 230, through passage 230, hollow 190 and passage 232 to upper stub 67 and exits to the manifold upper level.

With downflow and the disk rotated to the 500 CFM downflow setting (FIG. 6), air enters through upper stub 67 from the manifold upper level, passes through passage 232 tb hollow 192, through hollow 192, through passage 216 through throttling orifice 186, through passage 218, through passage 220 and through passage 222 to outlet 142 and the meter.

Air exhausted from the meter enters the selector inlet 144, passes through passage 224, 226, passage 228 to slot 188, through slot 88 to passage 230, through passage 230, hollow 190 and passage 214 to exit at lower stub 70 and the manifold lower level.

At the other two range settings, for upflow and downflow, the air paths through the selector are identical to those described except for the air traveling through one of the other four orifices 178, 180, 182 and 184. Thus, the air momentum losses through the selector are nearly identical for upflow and downflow at a particular range setting. This is due to the passages through the selector being nearly mirror images of one another at the settings for upflow and downflow. Minor differences in passage symmetry are adjusted for with the throttling screws associated with each orifice, as are the differences in air up and down flow patterns through the throat. Calibrations for upflow and downflow are separately performed for each range so that adjustment for minimal error at one range setting and one flow direction is independent of adjustement of and does not affect the remainder of the possible adjustments.

Figure 10:
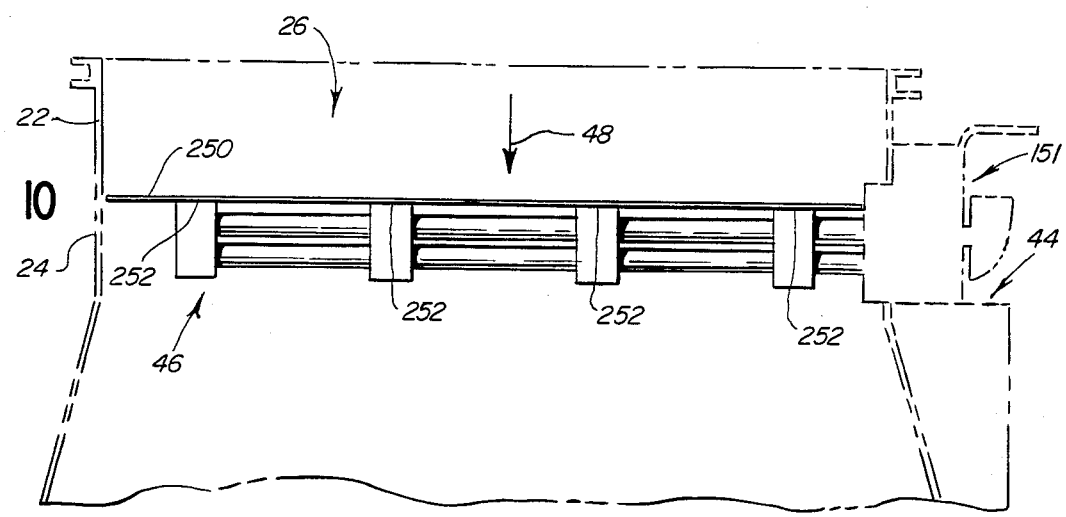
FIG. 10 is a side sectional view of the housing illustrating the relationship of the sheet and manifold for air downflow.
Figure 11:
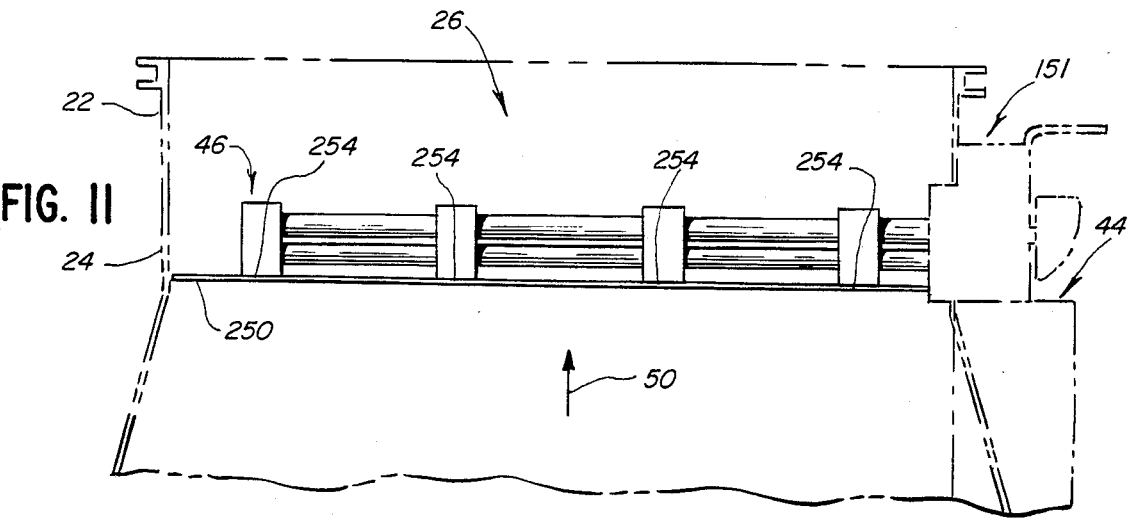
FIG. 11 is a side sectional view of the housing illustrating the relationship of the sheet and manifold for air upflow.

The range of air flow volume measurements performed by the apparatus is extended at its lower end by installing a square sheet 250 of perforated stock into the throat or aperture 26 of the housing 22. See FIGS. 9, 10 and 11. The sheet 250 is made of a thin, rigid material, such as aluminum or plastic that is dimensioned to be just larger than the throat 26 so that it is held in position in the aperture by the slight spring-like distortion of its shape. Alternatively, the sheet is slightly smaller than the throat and is mounted in the aperture by compression of a rubber gasket circumferentially mounted around the sheet, or the sheet 250 is mounted in any manner desired such as by sliding it into position through one of the sidewalls 24. In any event, the sheet must be in contact with the manifold on the upstream side. This increases the velocity of the air passing through the aperture in the plane at which air enters the manifold entrances. If the sheet 250 were located off from the plane of the manifold entrances, the increased velocity of the air through the aperture would not properly be sensed by the manifold and the air flow volume would incorrectly be indicated on meter 44. Thus in FIG. 10, sheet 250 is in contact with the top side surfaces 252 of manifold 46 for downflow of air indicated by arrow 48 and in FIG. 11, sheet 250 is in contact with the bottom side surfaces 254 of manifold 46 for upflow of air indicated by arrow 50.

Sheet 250 has holes 256 punched therein so that approximately 50% of its area is solid material and the other 50% of its area is open for air passage therethrough. This ratio of solid to open areas results in a doubling of the velocity of the air flowing through the sheet in the aperture, which in turn reduces by one half the previously available air flow range, i.e. from 500 to 250 CFM.

The holes 256 in sheet 250 are regularly spaced across the entire area of the sheet. This maintains the air flow pattern through the aperture and across the manifold similar to that without the sheet. One central opening through sheet 250 would seriously disrupt the air flow pattern through the aperture and across the manifold by introducing edge effects and turbulence and would result in improper air flow volume indications.

Additionally, there are 16 large openings 258 through the sheet 250 arranged to be in registration with the manifold entrances 72 and 74. These openings provide the air flowing through the throat 26 access to the entrances 72 and 74.

Sheet 250 may be provided by other than perforated stock, for example, screening may be used. Further, the use of different ratios of solid to open areas may be used with suitable construction of the selector and its settings. In any event, the ideal sheet would result in an equal velocity profile over the area of the aperture and manifold, and would be thin enough to avoid causing an additional pressure drop through the sheet. Sheet 250 approaches this ideal, although there are differences in air flow velocity across the areas of sheet 250.

In practice, sheet 250 provides a 0–250 CFM scale indication on meter 44 so that accurate readings on the order of 50-75-100 CFM are readily attainable. These low volume readings are required in modern systems using small volumes per register. Previously, the lowest accurate reading obtainable on the 500 CFM scale was 100 CFM. The invention thus not only improves the operation of the apparatus but makes it operable in low air flow volume environments where it previously was unusable.

Modifications and variations of the present invention are possible in light of the above teachings. It is therefore to be understood that within the scope of the appended claims the invention may be practiced otherwise than as specifically described.

What is claimed is:

1. An improved air flow volume measuring apparatus having a housing providing a throat of known cross sectional area; a manifold mounted in the throat and having an upper passage and lower passage with separate entrances from the respective upper and lower passages to the throat, the manifold receiving in the upper passage through the entrances a sample of air flowing down through the throat and exhausting said sample of air through the entrances from the lower passages, and the manifold receiving in the lower passage through the entrances a sample of air flowing up through the throat and exhausting said sample of air through the entrances from the upper passages; an air velocity meter indicating air flow volume as a function of air velocity and having a pipe stub inlet for receiving air and a pipe stub outlet for exhusting air; said improvement comprising:

A. a selector formed of a body having passages and a pocket therein and a cylindrical disk mounted in the pocket and rotatably moveable in the pocket by means of a knob to any one of a plurality of range positions for air upflow through the throat, a plurality of range positions for air downflow through the throat and an off position body having a pipe stub outlet connected to said meter pipe stub inlet and having a pipe stub inlet connected to said meter pipe stub outlet, the body having an upper pipe stub connected to said manifold upper passage and a lower pipe stub connected to said manifold lower passage;

B. said disk having one throttling orifice for each range position, the orifices being spaced from one another, and said disk having a slot separate from said orifices, said body and disk being constructed and arranged so that air from said manifold must pass through one of said orifices free of said slot in transit to said meter and air from said meter must pass through said slot free of said orifices in transit to said manifold during both upflow and downflow of air through said throat.

2. The apparatus of claim 1 in which said disk provides said throttling orifices arranged axially regularly spaced from one another on an arc extending substantially over one half of the circle of the disk.

3. The apparatus of claim 2 in which there is one calibration screw for each throttling orifice arranged radially of said disk for movement into and out of said orifice.

4. The apparatus of claim 2 in which said disk provides said slot extending axially through said disk across an arc extending substantially over one half of the circle of the disk opposite said throttling orifices.

5. The apparatus of claim 4 in which said disk provides an opposed pair of hollows arranged across half circles interior of said orifices and said slot.

6. The apparatus of claim 5 in which said body and disk passages are constructed and arranged so that air from said manifold must pass through one of said hollows to said orifices and said meter, and air from said meter and said slot must pass through the other of said hollows to said manifold.

7. The apparatus of claim 1 in which said throttling orifices are of varying diameters and are arranged in said disk in sequence, so that corresponding measurement ranges are arranged in corresponding positions on either side of a central OFF position.

8. The apparatus of claim 1 further including a calibrated area reducer selectively inserted in said throat for reducing the area of said throat by a certain amount while essentially maintaining the airflow pattern through the throat to extend the measuring range of the meter.

9. The apparatus of claim 8 in which said reducer is a sheet of perforated stock having a plurality of perforations regularly spaced across the area of the reducer to reduce the free area by approximately fifty percent.

10. The apparatus of claim 8 in which said reducer is inserted above said manifold in contact therewith for air downflow through the throat and is inserted below said manifold on contact therewith for air upflow through the throat.

11. An improved air flow volume measuring apparatus having a housing providing a throat of known cross sectional area; a manifold mounted in the throat and having an upper passage and lower passage with separate entrances from the respective upper and lower passages to the throat, the manifold receiving in the upper passage through the entrances a sample of air flowing down through the throat and exhausting said sample of air through the entrances from the lower passages, and the manifold receiving in the lower passage through the entrances a sample of air flowing up through the throat and exhausting said sample of air through the entrances from the upper passages; and an air velocity meter indicating air flow volume as a function of air velocity and having a pipe stub inlet for receiving air and a pipe stub outlet for exhausting air; a selector formed of a body having passages and a pocket therein and a cylindrical disk mounted in the pocket and rotatably movable in the pocket by means of a knob to any one of three range positions for air upflow through the throat, three range positions for air downflow through the throat and an off position, the body having a pipe stub outlet connected to said meter pipe stub inlet and having a pipe stub inlet connected to said meter pipe stub outlet, the body having an upper pipe stub connected to said manifold upper passage and a lower pipe stub connected to said manifold lower passage, said improvement comprising;

said disk having six throttling orifices, one for each range position, three orifices arranged on either side of a central OFF position, the orifices extending axially through the disk on an arc extending substantially over one half of the circle of the disk, said disk further having a slot extending axially through said disk across an arc extending substantially over one half of the circle of the disk opposite said throttling orifices, the disk and body being free of communicating passages between the orifices and slot and the disk and body being constructed and arranged so that air from said manifold must pass through one of said throttling orfices in transit to said meter and air from said meter must pass through said slot in transit to said manifold during both upflow and downflow of air through said throat.

12. The apparatus of claim 11 in which there is one calibration screw provided for each throttling orifice arranged radially of said disk for movement into and out of its related orifice.

13. The apparatus of claim 11 in which said disk provides an opposed pair of hollows arranged across half circles interior of said orifices and said outlet slot so that air from said manifold must pass through only one of said hollows to said orifices and said meter and air from said meter and slot must pass through only the other one of said hollows to said manifold.

14. The apparatus of claim 11 further including a calibrated area reducer selectively inserted in said throat for reducing the area of said throat by a certain amount while essentially maintaining the airflow pattern through the throat to extend the measuring range of the meter.

15. The apparatus of claim 14 in which said reducer is a sheet of perforated stock having a plurality of perforations regularly spaced across the area of the reducer to reduce the free area by approximately fifty percent.

16. The apparatus of claim 14 in which said reducer is inserted above said manifold in contact therewith for air downflow through the throat and is inserted below said manifold in contact therewith for air upflow through the throat.

* * * * *